US010087559B2

(12) United States Patent
Faurie et al.

(10) Patent No.: US 10,087,559 B2
(45) Date of Patent: Oct. 2, 2018

(54) GLASS, QUARTZ OR METAL PILE FABRIC

(71) Applicants: TISSAGES DES ROZIERS, Rozier-en-Donzy (FR); LOUTI, Dommartin (FR)

(72) Inventors: Jean-Michel Faurie, Dommartin (FR); Didier Chavanon, St Just Chaleyssin (FR); Gérard Compigne, Rozier-en-Donzy (FR); Emmanuel Periat, Cleppe (FR)

(73) Assignees: TISSAGE DES ROZIERS, Rozier-en-Donzy (FR); LOUTI, Dommartin (FR)

( * ) Notice: Subject to any disclaimer, the term of this patent is extended or adjusted under 35 U.S.C. 154(b) by 248 days.

(21) Appl. No.: 14/400,139

(22) PCT Filed: May 7, 2013

(86) PCT No.: PCT/EP2013/059539
§ 371 (c)(1),
(2) Date: Nov. 10, 2014

(87) PCT Pub. No.: WO2013/167625
PCT Pub. Date: Nov. 14, 2013

(65) Prior Publication Data
US 2015/0099090 A1 Apr. 9, 2015

(30) Foreign Application Priority Data
May 10, 2012 (FR) ...................... 12 54299

(51) Int. Cl.
*D03D 15/00* (2006.01)
*B01J 21/06* (2006.01)
*D03D 27/06* (2006.01)
*B01D 53/88* (2006.01)
*D03D 39/10* (2006.01)
*D03D 39/24* (2006.01)
*B01J 21/08* (2006.01)

(52) U.S. Cl.
CPC ......... *D03D 15/0011* (2013.01); *B01D 53/88* (2013.01); *B01J 21/063* (2013.01); *D03D 27/06* (2013.01); *D03D 39/10* (2013.01); *D03D 39/24* (2013.01); *B01D 2255/20707* (2013.01); *B01D 2255/20776* (2013.01); *B01D 2255/20792* (2013.01); *B01D 2255/802* (2013.01); *B01J 21/08* (2013.01); *D10B 2101/06* (2013.01); *D10B 2101/20* (2013.01); *D10B 2505/04* (2013.01); *Y10T 428/23957* (2015.04)

(58) Field of Classification Search
CPC .... D03D 27/06; D03D 15/00; D03D 15/0011; D03D 39/10; D03D 39/24; B01J 21/06; B01J 21/08; Y10T 428/23993
See application file for complete search history.

(56) References Cited

U.S. PATENT DOCUMENTS

| 2,381,218 | A | * | 8/1945 | Jacob | .................... D03D 27/00 139/391 |
|---|---|---|---|---|---|
| 2,385,577 | A | | 9/1945 | Jacob | |
| 3,764,448 | A | * | 10/1973 | Nisbet | .................... C03C 25/70 156/148 |
| 3,953,913 | A | | 5/1976 | Brown et al. | |
| 4,010,004 | A | * | 3/1977 | Brown | .................. D03D 15/00 139/391 |
| 4,167,482 | A | * | 9/1979 | Muller | .................. B01D 35/10 210/411 |
| 4,416,782 | A | * | 11/1983 | Kerres | ................. B01D 17/045 210/483 |
| 5,985,411 | A | * | 11/1999 | Pfeffer | ............... B01D 39/1623 428/152 |
| 5,989,677 | A | * | 11/1999 | Stuhler | .................. A47L 13/16 428/358 |
| 6,468,428 | B1 | | 10/2002 | Nishii et al. | |
| 6,771,866 | B2 | * | 8/2004 | Iimura | ..................... G02B 6/02 385/12 |
| 2003/0026585 | A1 | * | 2/2003 | Iimura | ..................... G02B 6/02 385/144 |
| 2007/0264467 | A1 | * | 11/2007 | Wang | ..................... B01J 35/004 428/90 |
| 2010/0029157 | A1 | | 2/2010 | Brochier et al. | |
| 2010/0029471 | A1 | * | 2/2010 | Wang | ...................... A62D 9/00 502/159 |
| 2014/0234163 | A1 | * | 8/2014 | Faurie | ..................... A61L 9/205 422/4 |

FOREIGN PATENT DOCUMENTS

| CN | 202507979 U | * | 10/2012 | |
| CN | 202820825 U | * | 3/2013 | |
| CN | 203493344 U | * | 3/2014 | |
| CN | 203493344 U | * | 3/2014 | |
| CN | 104761989 A | * | 7/2015 | |
| CN | 106113751 A | * | 11/2016 | |
| EP | 1008565 | | 6/2000 | |
| EP | 2 258 893 | | 12/2010 | |
| FR | 3013042 A1 | * | 5/2015 | ............... C02F 9/00 |

(Continued)

OTHER PUBLICATIONS

International Search Report for PCT/EP2013/059539 dated Mar. 13, 2014.
French Search Report for FR 1254299 dated Feb. 7, 2013.

*Primary Examiner* — Cheryl Juska
(74) *Attorney, Agent, or Firm* — B. Aaron Schulman, Esq.; Stites & Harbison PLLC

(57) ABSTRACT

The invention pertains to the field of technical textiles, and more particularly to the field of textiles used as a carrier, in particular as a carrier for active compounds or compounds to be activated. The invention thus relates to a glass, quartz, or metal pile fabric, as well as to a catalytic fabric. The invention also relates to a method for manufacturing said fabric.

12 Claims, No Drawings

(56) References Cited

FOREIGN PATENT DOCUMENTS

| GB | 964 508 | | | 7/1964 | |
|----|---------|---|---|--------|---|
| JP | 2000271415 | A | * | 10/2000 | |
| JP | 2004230065 | A | * | 8/2004 | |
| JP | 2008237793 | A | * | 10/2008 | |
| JP | 2011036405 | A | * | 2/2011 | |
| WO | WO-2015071429 | A1 | * | 5/2015 | ............... C02F 9/00 |

* cited by examiner

GLASS, QUARTZ OR METAL PILE FABRIC

FIELD OF INVENTION

The invention pertains to the field of technical textiles and in particular the field of textiles used as carrier, in particular as carrier for compounds that are active or can be activated. The invention therefore provides a pile fabric in glass, quartz or metal and a catalytic fabric.

The invention also concerns a method for manufacturing this fabric.

BACKGROUND OF THE INVENTION

EP-1008565 describes the use of glass fibres coated with titanium oxide as photocatalyst. The glass fibres are coated using a sol-gel process. This document describes the decomposing of organic substances, in particular sterilisation or deodorising by means of these coated glass fibres.

In this document, the increase in the effective surface area of titanium dioxide is obtained by multiplying the coating steps with photocatalyst or by using a surfactant during this coating step.

EP-823280 concerns filtration using devices integrating a photocatalyst. This photocatalyst is carried on a carrier which may be in glass and may comprise projecting portions. Additives can be added to the photocatalyst or can be used as sub-layer to improve photocatalysis.

WO-2008/087339 describes a fabric web comprising optical fibres and binding yarns the surface of which can be coated with photocatalytic particles. The optical fibres comprise alterations allowing the sideways emission of light to activate photocatalytic particles. The fabric web described in this document is of warp and weft woven type. No indication is given to improve the efficacy or yield of the fabric web.

BRIEF SUMMARY OF THE INVENTION

There is therefore a need to provide textiles in glass, metal and combinations thereof which can be used as carrier, in particular in the field of catalysis, and which give improved performance.

The invention therefore proposes a pile fabric in glass, quartz or metal, or combinations thereof, which brings a solution to all or part of the problems of prior art carriers or fabrics in glass or metal.

Advantageously, and the quantities of materials being equal, the fabric of the invention has an improved effective surface area. The pile yarns of the fabric of the invention allow an increased contact surface with the surrounding medium.

DETAILED DESCRIPTION OF EXEMPLARY EMBODIMENTS

The invention therefore provides a pile fabric comprising:
- a weft and at least one ground warp in twisted yarns in glass, metal or combinations thereof, of size ranging from 5 to 2000 tex;
- a pile warp with pile height between 0.5 and 15 mm the yarns of which are twisted yarns in glass, metal or combinations thereof, of size ranging from 5 to 2000 tex.

Preferably, the fabric of the invention comprises a weft, a ground warp and a pile warp. Also preferably, the fabric of the invention comprises a weft, two ground warps and a pile warp.

Preferably, the fabric of the invention is a cut-pile or warp velvet or cut-pile warp velvet. Advantageously the pile height of the fabric of the invention is between 1 and 10 mm or between 2 and 8 mm.

The pile density of the fabric of the invention is between 50 and 200 pile yarn per $cm^2$, preferably between 80 and 160 pile yarn per $cm^2$, in particular between 60 and 120 pile yarn per $cm^2$.

For the fabric of the invention, the yarns used can be in glass, metal or combinations thereof. The yarns used to manufacture the fabric of the invention are preferably in glass and in particular in silica, purified silica or quartz, more particularly yarns made from quartz crystals. Yarns in lead crystal or lead glass or even soda-lime glass are also suitable for producing the fabric of the invention.

As examples of glass yarns used to produce a fabric of the invention, mention can be made of yarns produced from highly pure silica fibres that are continuous, non-porous, homogeneous and amorphous. The purity of the silica may be higher than 90%, 95% or even higher than 99.99%.

The yarns used may also be in metal, preferably in steel, particularly in stainless steel.

The fabric of the invention may also be produced from mixtures of different yarns, in particular mixtures of different glass yarns or mixtures of glass yarns and metal yarns, in particular mixtures of quartz yarns and stainless steel yarns.

Preferably the yarns used for the fabric of the invention are non-elastic, have good resistance to UV radiation and to heat treatments, or to treatments with chemical agents.

These yarns can advantageously be selected from among cable yarns.

In general, the size of the yarns used may range from 10 to 500 tex or from 15 to 200 tex or from 20 to 100 tex or from 25 to 80 tex or from 40 to 75 tex.

The invention also concerns the manufacture of a pile fabric according to the invention. The invention therefore provides a method for manufacturing a fabric, comprising:
- at least one warping to prepare at least one ground warp of twisted yarns in glass, in metal or combinations thereof, of size ranging from 5 to 2000 tex;
- warping to prepare a pile warp in glass, in metal or combinations thereof, of size ranging from 5 to 2000 tex;
- weaving the ground and pile warps and the weft;
- cutting the pile warp yarns allowing a fabric to be obtained comprising:
  - a weft and at least one ground warp of twisted yarns in glass, metal or combinations thereof of size ranging from 5 to 2000 tex;
  - a pile warp having a pile height between 0.5 and 15 mm the yarns of which are twisted yarns in glass, metal or combinations thereof, of size ranging from 5 to 2000 tex.

Preferably, the method of the invention therefore allows a fabric to be produced comprising a weft, a ground warp and a pile warp.

Also preferably the method of the invention therefore allows a fabric to be produced comprising a weft, two ground warps and a pile warp.

For the manufacturing method of the invention, the tension of the ground warp is preferably between 5 and 30 g/yarn (grams per yarn).

Also preferably the tension of the pile warp is between 5 and 30 g/yarn.

Advantageously the weaving speed of the method of the invention is between entre 70 rounds/min and 300 rounds/min, preferably between 80 rounds/min and 200 rounds/min.

With respect to warping, the warping speed is generally between 10 and 80 m/min, preferably between 20 and 40 m/min, for example 30 m/min.

The pile fabric of the invention can be produced using a fabric manufacturing device comprising:
- a warping part to prepare at least one ground warp or pile warp;
- means for preparing the weft;
- a part for weaving the ground and pile warps and the weft;
- means for cutting the yarns of the pile warp and allowing the production of a fabric comprising:
  - a weft and at least a ground warp of twisted yarns in glass, in metal or combinations thereof, of size ranging from 5 to 2000 tex;
  - a pile warp having a pile height of between 0.5 and 15 mm the yarns of which are twisted yarns in glass, in metal or combinations thereof, of size ranging from 5 to 2000 tex.

Advantageously, the means for preparing the weft is a shuttle or needles.

The cutting means are advantageously selected from among metal rods having a width of between 0.1 mm and 2 mm or a height between 0.5 mm and 15 mm, or from among a circular knife or razors allowing a pile height to be cut of between 0.5 mm and 15 mm.

Preferably, a device D1 can be used to manufacture a fabric of the invention which comprises:
- a warping part to prepare a ground warp or pile warp;
- means for preparing the weft;
- a part to weave the ground warp, pile warp and weft;
- means for cutting the pile warp yarns selected from among metal rods of width between 0.1 mm and 2 mm or having a height between 0.5 mm and 15 mm; and allowing a fabric to be produced comprising:
  - a weft and a ground warp of twisted yarns in glass, metal or combinations thereof, of size ranging from 5 to 2000 tex;
  - a pile warp of pile height between 0.5 and 15 mm, the yarns of which are twisted yarns in glass, metal or combinations thereof of size ranging from 5 to 2000 tex.

It is also possible to use a device D2 to manufacture a fabric of the invention, which comprises:
- a warping part to prepare two ground warps and a pile warp;
- means for preparing the weft;
- a part to weave the two ground warps, the pile warp and the weft;
- means for cutting the pile warp yarns selected from among a circular knife and razors allowing a pile height to be cut of between 0.5 mm and 15 mm; and allowing a fabric to be manufactured comprising:
  - a weft and two ground warps of twisted yarns of glass, metal or combinations thereof, of size ranging from 5 to 2000 tex;
  - a pile warp of pile height between 0.5 and 15 mm, the yarns of which are twisted yarns in glass, metal or combinations thereof, of size ranging from 5 to 2000 tex.

The fabric of the invention can be used in numerous technical fields. In particular, it can be used as carrier.

The mechanical characteristics and the thermal properties of the pile fabric according to the invention can advantageously be given use as insulating materials or fabric, in particular in the building and aeronautics sectors.

Advantageously, the invention concerns a fabric of the invention as carrier, in particular as carrier of at least one active compound such as a catalyst or a photocatalyst.

The invention therefore provides a catalytic pile fabric comprising:
- a weft and at least one ground warp of twisted yarns in glass, metal or combinations thereof, of size ranging from 5 to 2000 tex;
- a pile warp of pile height between 0.5 and 15 mm, the yarns of which are twisted yarns in glass, metal or combinations thereof, of size ranging from 5 to 2000 tex;
- at least one catalyst.

Preferably, the catalyst carried by the pile fabric of the invention is a photocatalyst e.g. a catalyst comprising titanium, tungsten, zinc or mixtures thereof.

As preferred catalysts, titanium dioxide ($TiO_2$) or zinc oxide (ZnO) or the mixtures thereof are particularly advantageous, in particular titanium dioxide.

In general, the catalytic fabric of the invention is defined in accordance with all the characteristics of the pile fabric of the invention both with regard to its general characteristics and its particular advantageous or preferred characteristics combined with at least one catalyst.

The invention therefore provides a catalytic fabric comprising a catalyst such as a photocatalyst in particular in titanium, tungsten, zinc catalyst or mixtures thereof, in particular $TiO_2$ and ZnO, preferably $TiO_2$, carried on a pile fabric of the invention combining the following characteristics in whole or in part:
- the fabric comprises a weft, a ground warp and a pile warp, or else the fabric comprises a weft, two ground warps and a pile warp;
- the fabric is a cut-pile or warp velvet or cut-pile warp velvet;
- the pile height of the fabric is between 1 and 10 mm or between 2 and 8 mm;
- the pile density of the fabric is between 50 and 200 pile yarns per $cm^2$, preferably between 80 and 160 pile yarns per $cm^2$, in particular between 60 and 120 pile yarns per $cm^2$;
- the yarns used are in glass, in metal such as steel, in particular stainless steel; preferably the yarns used are in glass and in particular in silica, in purified silica or quartz, in particular prepared from quartz crystals, or the yarns are in lead crystal or lead glass or in soda-lime glass, or the yarns are produced from highly pure silica fibres, for example of purity higher than 90%, 95% or 99%, even 99.99%; or from mixtures or combinations of yarns, in particular from mixtures of different glass yarns or mixtures of glass yarns and metal yarns, in particular mixtures of quartz yarns and stainless steel yarns;
- the yarns are selected from among cable yarns;
- the yarns used are of size ranging from 10 to 500 tex or 15 to 200 tex or 20 to 100 tex or 25 to 80 tex or 40 to 75 tex.

Advantageously, the invention provides a catalytic pile fabric comprising:
- a weft and at least one ground warp of twisted yarns in silica or in quartz, of size ranging from 5 to 2000 tex;
- a pile warp of pile height between 0.5 and 15 mm, the yarns of which are twisted yarns in silica or quartz, of size ranging from 5 to 2000 tex;
- at least one photocatalyst comprising $TiO_2$.

The catalytic fabric of the invention is prepared using a method comprising the depositing of the catalyst on the pile fabric of the invention.

This deposit can performed for example using different methods known to persons skilled in the art. In particular it can be performed by spraying the catalyst onto the fabric or by dipping the fabric in a catalyst sol-gel solution or by high-powered pulsed magnetron, via Metal Organic Chemical Vapour Deposition (MOCVD), via Metal Organic Vapour Phase Epitaxy (MOVPE)), via Atomic Layer Deposition (ALD) or Chemical Vapour Phase (CVD).

The invention also concerns the use of the catalytic fabric of the invention in different technical fields requiring at least one carried catalyst. The pile fabric of the invention has a particularly high surface area and allows a catalytic fabric to be obtained having improved efficacy compared with catalyst carriers in the prior art.

Therefore, the catalytic fabric of the invention can be given advantageous use in the field of the purification of liquid or gaseous fluids, or for the deodorising of gaseous fluids.

The catalytic fabric of the invention can also be used in the field of chemical catalysis.

The invention therefore provides a method for purifying a liquid or gaseous fluid, comprising the use of a catalytic fabric of the invention.

The purification method of the invention can be applied in particular to air treatment in homes, medical air treatment, to high level air treatments. The method can therefore advantageously be used for the treatment of air in hospital wards, in clean rooms, refrigerated storage areas, breeding enclosures, rooms in the home, living spaces, offices, etc. and for the treatment of industrial discharges.

The purification method of the invention can also be given advantageous use for the deodorising of air in particular in the aforementioned applications, for example in the treatment of food odours, industrial discharges, solvent odours, etc.

The purification method of the invention can be also be used to depollute aqueous effluent.

A description will now be given of the present invention with the help of non-limiting examples.

EXAMPLE 1

Double-layer Quartz Velvet

Using silica yarns (Quartzel C9 33×2 S150 QS13 by Saint-Gobain, France) of 33 tex with two ends (tex 67 for the yarn used) and with 150-turn twist, a double-layer quartz fabric of the invention was prepared.

On an adapted loom the following steps were carried out:
1. winding of yarns for creel loading;
2. warping the two ground warps then warping the pile warp;
3. beaming the three warps on their warping beams;
4. knotting the two ground warps and knotting the pile warp;
5. weaving face-to-face the ground warps and pile warp (the pile warp binds together the top piece—ground warp no1, and the bottom piece—ground warp no2, to form a velvet);
6. separating the two ground warps (no1 and no2) with a cutting knife to separate the top and bottom pieces;
7. winding the two pieces on a take-up roller.

A double-layer quartz velvet of the invention was thus obtained.

EXAMPLE 2

Single-layer Quartz Velvet

Using identical yarn to the yarn used in Example 1, a single layer quartz velvet of the invention was prepared.

On an adapted loom, the following steps were carried out:
1. winding of yarns for creel loading;
2. warping the ground warp then warping the pile warp;
3. beaming the two warps on their warping beams;
4. knotting the ground warp and knotting the pile warp;
5. weaving the ground warp and pile warp;
6. cutting the pile (the pile warp comes to lie on the metal rods to form a velvet, the height of the metal rods defining the pile height);
7. winding the cloth on a take-up roller.

In this manner a single-layer velvet of the invention was obtained.

EXAMPLE 3

Catalytic Fabric Carrying $TiO_2$

Several samples of a single-layer quartz velvet of the invention were prepared from Example 2.

These samples were shaped by cutting and sewing and then cleaned (degreasing) by wet dipping at about 80° C. in a 0.5% aqueous solution of ethoxylated fatty alcohol polyglycol (8 OE) (Zuzolat 1008/25 by Zschimmer et Schwarz).

The catalyst $TiO_2$ was then deposited by spraying or dipping in a sol-gel of $TiO_2$ and silica at 400 mL/m$^2$.

EXAMPLE 4

Catalytic Efficacy of a $TiO_2$ Catalytic Fabric

The efficacy of the photocatalytic fabric of the invention was evaluated by degradation of formic acid compared with different prior art carried catalysts.

A sample of quartz velvet fabric (surface area: 9 cm$^2$) was prepared in accordance with Example 3.

70 mL of an aqueous formic acid solution were prepared (50 mg/L).

The photocatalytic fabric was immersed in the solution under stirring for 30 min.

The solution containing the photocatalytic fabric was irradiated (UVC, 3.2 mW/cm$^2$) for 180 min.

Degradation of the formic acid was monitored by cation exchange column HPLC eluting with dilute sulphuric acid and with UV absorption detection.

Under the same conditions, the efficacy of different carried photocatalysts of the prior art was compared with the efficacy of the photocatalytic fabric of the invention.

The results are grouped together in Table 1.

TABLE 1

| Deposit carrier (30 mm × 30 mm) | Catalyst deposit method | Mean initial velocity mg/L/min | initial endurance velocities mg/L/min |
|---|---|---|---|
| quartz velvet of the invention | dipping | 0.22 | 0.21/0.23/0.21/0.21 |

TABLE 1-continued

| Deposit carrier (30 mm × 30 mm) | Catalyst deposit method | Mean initial velocity mg/L/min | initial endurance velocities mg/L/min |
|---|---|---|---|
| stainless steel plate | dipping | 0.11 | 0.12/0.12/0.09/0.09 |
| flat glass plate | dipping | 0.16 | — |
| glass plate (Lumiclean Saint-Gobain) | — | 0.09 | — |
| cellulose fabric (Alsthom paper) | — | 0.14 | — |

It was found that the initial degradation velocity of formic acid obtained with the photocatalytic fabric of the invention is higher than that of all the carried catalysts of the state of the art.

In addition the endurance of the photocatalytic fabric of the invention, measured with 4 successive tests, showed that this photocatalytic fabric is efficient without loss of photocatalytic activity.

The invention claimed is:

1. A photocatalytic fabric forming a contact surface for treatment of a surrounding medium, wherein the medium is air, said photocatalytic fabric comprising a pile fabric consisting of:
   a weft and at least one ground warp of twisted glass yarns, of size ranging from 5 to 2000 tex; and
   a pile warp of pile height between 2 and 8 mm, the yarns of which are twisted yarns made of glass, of size ranging from 5 to 2000 tex;
   wherein the photocatalytic pile fabric comprises at least one photocatalyst,
   wherein the pile fabric is a carrier for the photocatalyst and wherein the photocatalyst is deposited on the pile fabric;
   wherein the photocatalyst is deposited by spraying the photocatalyst onto the pile fabric, or by dipping the pile fabric into a solution of photocatalyst; and
   wherein the pile density of the pile fabric is between 60 and 120 pile yarns per cm$^2$.

2. The photocatalytic fabric according to claim 1 wherein the catalyst comprises titanium, tungsten or zinc or mixtures thereof.

3. The photocatalytic fabric according to claim 1 wherein the catalyst comprises titanium dioxide (TiO$_2$) or zinc oxide (ZnO) or mixtures thereof.

4. The photocatalytic fabric according to claim 1 comprising a weft, a ground warp and a pile warp, or comprising a weft, two ground warps and a pile warp.

5. The photocatalytic fabric according to claim 1 which is a cut-pile or warp velvet or cut-pile warp velvet.

6. The photocatalytic fabric according to claim 1 wherein the weft and ground warp yarns or the pile yarns are cable yarns.

7. The photocatalytic fabric according to claim 1 wherein the weft and ground warp yarns or pile yarns are glass yarns comprised of silica, purified silica, or quartz.

8. The photocatalytic fabric according to claim 1 wherein the weft and ground warp yarns or pile yarns have a size ranging from 10 to 500 tex.

9. A method for manufacturing a photocatalytic pile fabric, said photocatalytic pile fabric forming a contact surface for treatment of a surrounding medium, wherein the medium is air, said method comprising manufacturing a pile fabric comprising the following:
   at least one warping to prepare at least one ground warp of twisted glass yarns, of size ranging from 5 to 2000 tex;
   warping to prepare a pile warp having a pile height between 2 and 8 mm in glass and a size ranging from 5 to 2000 tex;
   weaving the ground and pile warps with a weft of twisted glass yarns of size ranging from 5 to 2000 tex; and
   cutting the pile warp yarns;
   so that the manufactured pile fabric consists of a weft and at least one ground warp of twisted glass yarns, of size ranging from 5 to 2000 tex; and of a pile warp of pile height between 2 and 8 mm, the yarns of which are twisted yarns made of glass, of size ranging from 5 to 2000 tex; and
   said method further comprising a step of depositing a photocatalyst on the pile fabric for forming the photocatalytic pile fabric for treatment of a surrounding medium, wherein the medium is air,
   wherein the photocatalyst is deposited by spraying the photocatalyst onto the pile fabric, or by dipping the pile fabric into a solution of photocatalyst, and
   wherein the pile density of the pile fabric is between 60 and 120 pile yarns per cm$^2$.

10. The method according to claim 9, wherein there are sufficient warpings to prepare either:
   (a) one ground warp of twisted glass yarns, of size ranging from 5 to 2000 tex; or
   (b) two ground warps of twisted glass yarns, of size ranging from 5 to 2000 tex.

11. The method according to claim 9 wherein the tension of the ground warps is between 5 and 30 g/yarn or the tension of the pile warp is between 5 and 30 g/yarn.

12. The method according to claim 9 wherein the weaving speed is between 70 rounds/min and 300 rounds/min.

* * * * *